H. F. & G. F. SHAW.
Corn Sheller.
No. 50,740.  Patented Oct. 31, 1865.
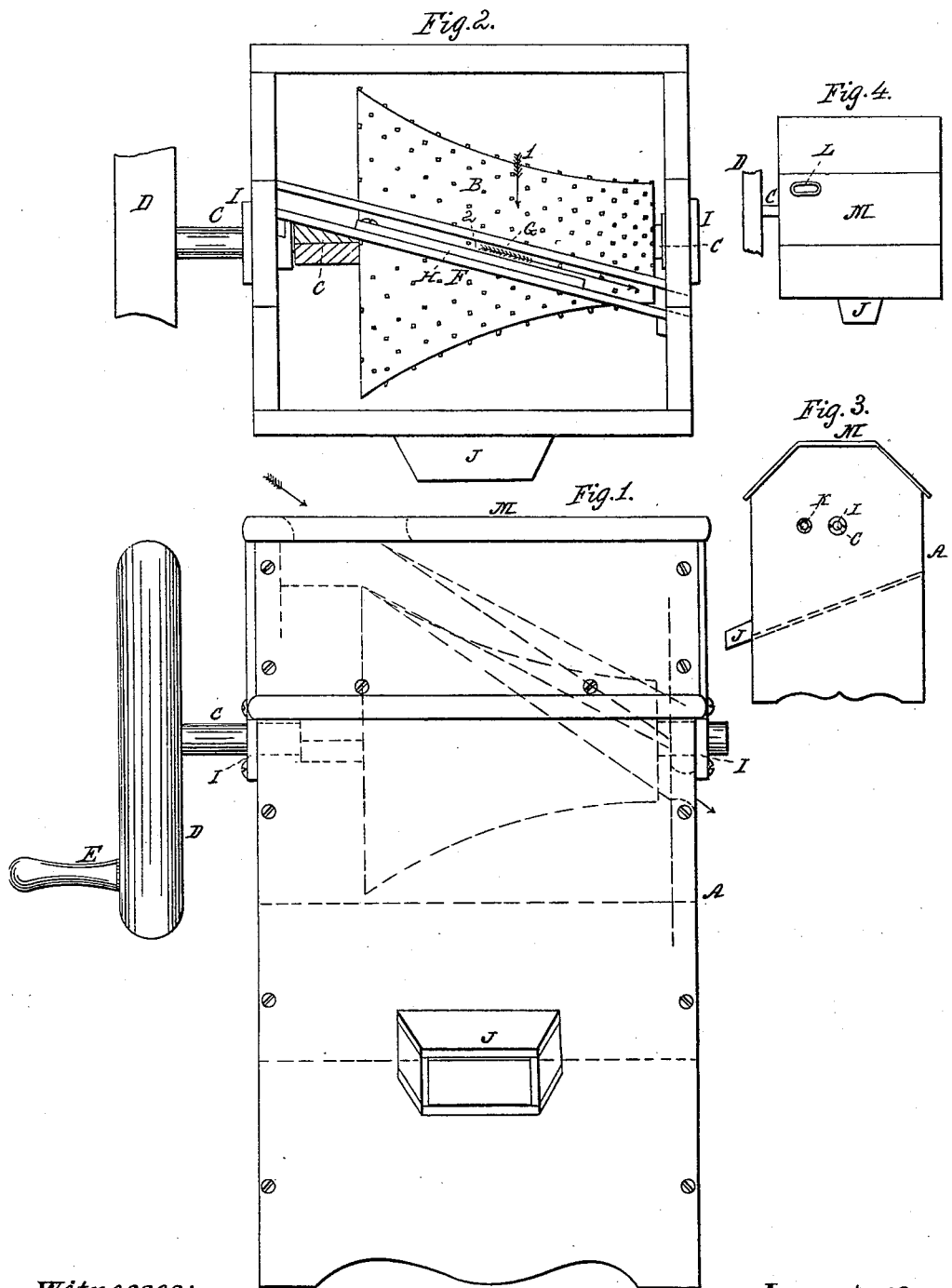
Witnesses:
Inventors:

UNITED STATES PATENT OFFICE.

H. F. SHAW AND G. F. SHAW, OF WEST ROXBURY, MASSACHUSETTS.

IMPROVEMENT IN CORN-SHELLERS.

Specification forming part of Letters Patent No. 50,740, dated October 31, 1865.

*To all whom it may concern:*

Be it known that we, H. F. SHAW and G. F. SHAW, of West Roxbury, in the county of Norfolk and State of Massachusetts, have invented a new and useful Improvement in Corn-Shellers; and we do hereby declare that the following is a full, clear, and exact description of the construction and operation of the same, reference being had to the accompanying drawings, forming a part of this specification, in which—

Figure 1 is a front elevation. Fig. 2 is a top view with the cover removed. Fig. 3 is a diminished end elevation. Fig. 4 is a diminished top view with the cover on.

Like parts are indicated by the same letters in all the figures.

The nature of our invention consists in the employment of a bell-shaped shelling-burr arranged upon a horizontal axis or shaft in combination with a guide bar or bars arranged diagonally with the axis of said burr and extending from a point about vertical to the axis of the large end of the burr and terminating at one side horizontally at the smaller end of the burr, the whole being inclosed in a suitable box with proper openings to admit the ears of corn to be shelled and to discharge the cobs and shelled corn, as will be explained.

To enable others skilled in the art to make and use our improvements, we will now proceed to describe its construction and operation.

A is a wooden box inclosing the shelling apparatus and shaped as clearly shown in the drawings.

B is a bell-shaped shelling-burr, of cast-iron or other suitable metal, either cast hollow and in one piece or made in sections and confined together or attached to a core or axis in any obvious manner, the periphery being provided with little teeth, nubs, or ridges like the shelling-surfaces now in general use. This burr B, instead of being straight in the line of its axis, is made of an irregularly-curved concave form, its base being from two and a half to three and a half times the diameter of its point or even more, as clearly shown in Figs. 1 and 2, so that the guide-bars F and G may be placed (as they are) diagonally with the axis of the cone and still be straight and sufficiently near the periphery of the same to keep the ears and cobs from passing under them. These guide-bars F and G are made of wood or metal, and arranged as shown in Fig. 1, and also by the dotted lines in Fig. 2, starting from a point about vertical to the axis of the burr at its large end, and terminating at one side horizontally of the axis at the small end thereof, their extremities being confined by means of cleats, nails, or screws, or in any other obvious manner to the ends of the box A, their under sides being about three-eighths of an inch from the periphery of the cone B, so that kernels of corn (but not cobs) may pass beneath them.

H is a flat spring of wood or metal, attached at its upper end to the guide-bar F at such a distance from the burr B as to admit an ear of corn between them, and yielding enough to allow the ear to pass, while at the same time it is pressed sufficiently hard upon the shelling-surface to remove the kernels.

C is the shaft or axis of the burr B, which runs in suitable metallic bearings I I, fixed in the ends of the box A, as clearly shown in the drawings.

D is a fly-wheel attached to the shaft C, and E is the crank by which the machine is turned by hand. It may, however, be driven by any other power, if required, and a number of burrs similar to B may be, with their appendages, attached to a common driving-shaft and inclosed in a single box, thereby becoming a power-sheller capable of shelling as fast as several hands can feed in the ears.

In one end of the top M of the box A is an opening, L, through which the ears of corn are fed between the guide-bars F and G, there being an inclined guide (represented by the dotted lines in Fig. 2) attached to the under side of the cover M, below said opening, and extending nearly to the larger end of the burr B, to direct the ears onto the periphery of the same. Through the opposite end of the box, between the lower ends of the bars F G, is a round hole, K, through which the cob passes out and drops onto the floor or into any suitable receptacle.

Below the burr B is an inclined board or bottom (represented by dotted lines in Fig. 3) extending from side to side and end to end of the box A, onto which the shelled kernels of corn drop and slide downward through a hole in the side of the box, and thence through the spout J into any suitable receptacle placed beneath.

The guide-bars F G being arranged at an angle of about ten degrees horizontally and twenty degrees vertically with the axis of the concave bell-shaped burr B, and the latter being turned in the direction of the arrow 1 in Fig. 1, an ear of corn between said guides and burr will be rotated and driven downward in the direction of the arrow 2, the kernels will be picked or torn from the cob by the action of the teeth, nubs, or ridges on the burr, and the cob will be expelled through the hole K, while the kernels will drop and be delivered through the spout J. If the burr B were turned in an opposite direction the ear would be driven in a direction opposite to arrow 2. Hence it follows that the progressive motion of the ear is owing to its lying on the burr at an angle with its axis corresponding to the angle of the guide bar or bars, and were the burr not made concave the ear would touch its (the burr's) periphery only at a single point. It also follows that the more diagonally the ear is placed to the axis of the burr the more rapidly it will be driven forward. We find, however, that about the angle ten degrees (represented in Fig. 1) is practically the best.

The object in making one end of the burr so much larger than its other end is that the largest end, where the ears are fed in, having about three times as much motion as the smaller end, may give the ear a rapid rotation around its own axis before the shelling operation begins, and that the slower but more powerful motion of the smaller portion of the burr may do the work of shelling after the ear has received its momentum both in a rotary and an advancing line by this larger and more rapidly moving part of the burr.

The object in starting the guides at a point vertical to the axis of the burr and terminating them at one side thereof is that the ear may rest mainly upon the burr itself while it is receiving its rotation and is afterward being shelled, the inclination or obliquity of said guide or guides being in a horizontal plane about ten degrees and in a vertical plane about twenty degrees with regard to the axis of the burr.

Having thus described the construction and operation of our invention, what we claim as new, and desire to secure by Letters Patent, is—

The employment of a bell-shaped rotating sheller, in combination with a guide bar or bars arranged diagonally both in a horizontal and in a vertical plane with the axis of the burr, substantially as and for the purpose described—viz., for giving the ear of corn a very rapid rotation around its own axis at the larger end of the burr before the main part of the shelling takes place at the smaller end thereof.

H. F. ·SHAW.
G. F. SHAW.

Witnesses:
  N. AMES,
  GEO. K. CLARKE.